United States Patent
Sunayama et al.

(10) Patent No.: US 7,636,837 B2
(45) Date of Patent: Dec. 22, 2009

(54) APPARATUS AND METHOD FOR CONTROLLING INSTRUCTIONS AT TIME OF FAILURE OF BRANCH PREDICTION

(75) Inventors: Ryuichi Sunayama, Kawasaki (JP);
Aiichirou Inoue, Kawasaki (JP);
Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/114,202

(22) Filed: Apr. 26, 2005

(65) Prior Publication Data

US 2005/0188187 A1    Aug. 25, 2005

Related U.S. Application Data

(63) Continuation of application No. PCT/JP03/06668, filed on May 28, 2003.

(51) Int. Cl.
*G06F 12/00* (2006.01)
(52) U.S. Cl. .................. 712/239; 712/233; 711/118; 711/133
(58) Field of Classification Search ................ 712/220, 712/233, 234, 239, 23, 240
See application file for complete search history.

(56) References Cited

U.S. PATENT DOCUMENTS

| | | | |
|---|---|---|---|
| 4,853,840 A | | 8/1989 | Shibuya |
| 5,136,696 A | * | 8/1992 | Beckwith et al. ............. 712/240 |
| 5,748,976 A | * | 5/1998 | Taylor ......................... 712/240 |
| 5,796,997 A | * | 8/1998 | Lesartre et al. ............... 712/234 |
| 5,799,167 A | * | 8/1998 | Lesartre ...................... 712/218 |
| 5,809,530 A | * | 9/1998 | Samra et al. ................. 711/140 |
| 5,893,143 A | * | 4/1999 | Tanaka et al. ................ 711/120 |
| 5,918,046 A | * | 6/1999 | Hoyt et al. ................... 712/239 |
| 6,157,986 A | * | 12/2000 | Witt ........................... 711/118 |

(Continued)

FOREIGN PATENT DOCUMENTS

JP        7-306785        11/1995

(Continued)

OTHER PUBLICATIONS

Tanenbaum, Modern Operaging Systems, 2001, Prentice-Hall, pp. 23-28.*

(Continued)

*Primary Examiner*—Henry W. H. Tsai
*Assistant Examiner*—Cheng-Yuan Tseng
(74) *Attorney, Agent, or Firm*—Staas & Halsey LLP

(57) ABSTRACT

An apparatus includes a branch instruction prediction unit configured to make branch prediction, and a branch prediction control unit configured to control an instruction fetch control unit, an instruction buffer, an instruction decoder, and the branch instruction prediction unit, wherein when the branch prediction control unit ascertains that the branch prediction by the branch instruction prediction unit is erroneous, the branch prediction control unit outputs to the instruction fetch control unit a signal for suppressing an instruction fetch request already supplied to the memory unit and outputs to the instruction buffer a signal for nullifying the instruction buffer during a period between a point in time at which the ascertainment is made by the branch prediction control unit that the branch prediction by the branch instruction prediction unit is erroneous and a point in time at which the instruction buffer fetches a correct instruction from the memory unit.

9 Claims, 11 Drawing Sheets

U.S. PATENT DOCUMENTS

| | | | |
|---|---|---|---|
| 6,173,393 B1* | 1/2001 | Palanca et al. | 712/224 |
| 6,237,065 B1* | 5/2001 | Banerjia et al. | 711/133 |
| 6,311,261 B1* | 10/2001 | Chamdani et al. | 712/23 |
| 6,725,337 B1* | 4/2004 | Sander et al. | 711/133 |
| 6,851,043 B1 | 2/2005 | Inoue | |
| 6,912,650 B2* | 6/2005 | Ukai et al. | 712/237 |
| 7,015,921 B1* | 3/2006 | Trivedi et al. | 345/557 |
| 7,133,975 B1* | 11/2006 | Isaac et al. | 711/141 |
| 2004/0003203 A1* | 1/2004 | Ukai | 712/205 |
| 2004/0193857 A1* | 9/2004 | Miller et al. | 712/240 |

FOREIGN PATENT DOCUMENTS

| | | |
|---|---|---|
| JP | 9-218786 | 8/1997 |
| JP | 9-274565 | 10/1997 |
| JP | 2000-181710 | 6/2000 |
| JP | 2000-181711 | 6/2000 |
| JP | 2000-322257 | 11/2000 |

OTHER PUBLICATIONS

Morancho, Recovery Mechanism for Latency Misprediction, 2001, IEEE, pp. 1-11.*

Sharangpani, Itanium Processor Microarchitecture, 2000, IEEE, pp. 1-20.*

JPO Office Action dated May 30, 2006 of Application No. JP 2005-500202.

* cited by examiner

APPARATUS AND METHOD FOR CONTROLLING INSTRUCTIONS AT TIME OF FAILURE OF BRANCH PREDICTION

CROSS-REFERENCE TO RELATED APPLICATION

This is a continuation of International Application No. PCT/JP2003/06668, filed on May 28, 2003, the entire contents of which are hereby incorporated by reference.

BACKGROUND OF THE INVENTION

1. Field of the Invention

The present invention generally relates to instruction control units provided in the central processing units of computers, and particularly relates to an instruction control system that suppresses or nullifies erroneous instruction fetch requests and operand requests at the time of failure of branch prediction until it becomes possible to issue another instruction fetch request to the memory in an instruction control device of an out-of-order type having a branch prediction function.

2. Description of the Related Art

Control methods for controlling instruction control units (instruction units) provided in the central processing units of computers include an in-order method and an out-of-order control method. In the in-order control method, instructions are executed in the order in which they are stored in memory.

In the out-of-order control method, on the other hand, a plurality of instructions following a given instruction are successively thrown into the execution pipeline for execution of these instructions without waiting for the completion of the execution of the given instruction. Namely, instructions are executed while changing the order in which the instructions are executed in the execution pipeline by a plurality of computing units. In the end, the execution of the instructions as a whole finishes in an in-order state. That is, the entry of instructions into the execution pipeline and the completion of the instructions coming out of the execution pipeline are performed in the given order while the instructions are actually executed out of turn inside the execution pipeline.

Even in the out-of-order control method, the results of execution of a preceding instruction may affect the execution of the following instructions. In such a case, the following instructions cannot be executed until the execution of the preceding instruction comes to end. That is, a wait for the completion of the preceding instruction continues as long as it is necessary.

This is frequently observed with respect to the execution of branch instructions as in the case in which the preceding instruction noted above is a branch instruction. Branch instructions include a conditional branch instruction and an unconditional branch instruction. Among the branch instructions, the conditional branch instruction, in particular, is not determinative as to whether branching takes place or not until branch conditions are fixed upon the completion of those instructions which are being executed prior to the branch instruction and which affect the branch conditions.

Since the sequence of instructions following this conditional branch instruction cannot be determined, following instructions cannot be thrown into the execution pipeline, which thus results in the suspension of processing. As a result, the performance of the system drops.

Such drop in the performance equally occurs in instruction control units employing other control methods, and is a common issue in the field of instruction control units. In order to solve this issue of a performance drop caused by branch instructions, a prediction mechanism for predicting the execution of a branch instruction is typically provided in the instruction control unit in an attempt to increase the execution speed of branch instructions.

In the out-of-order control method having the branch prediction mechanism, a plurality of branch instructions are thrown into the execution pipeline according to the results of branch prediction. The presence/absence of branching and the success/failure of branch prediction are determined successively for the branch instructions as branch conditions are successively determined for these branch instructions.

If a branch prediction by the branch prediction mechanism is correct, instructions following the predicted branch instruction thrown into the execution pipeline are correct. If the branch instruction is incorrect, however, the instructions following the predicted branch instruction are an erroneous instruction sequence, which needs to be erased from the execution pipeline. A correct instruction sequence then needs to be prepared for execution.

When a branch prediction fails, an instruction fetch is performed again. After it is found that a branch prediction by the branch prediction mechanism has failed, however, some time period may pass before an instruction fetch is performed again or before the erroneous instruction sequence is removed from the execution pipeline.

During such time period, instructions that are not to be executed are in existence in the execution pipeline. From these instructions that are not to be executed, operand requests may be issued. The same applies in the case of instruction fetches. That is, unnecessary requests are issued with respect to an instruction sequence that is not to be used. When unnecessary operand requests or instruction fetch requests are issued, needless replacement takes place in the cache memory, or instruction control resources such as computing units are needlessly consumed. This results in a performance drop.

When a check as to the branching of a branch instruction is made to ascertain that the branch prediction has filed, there is a need to reissue an instruction fetch request to the instruction fetch control unit. In order to reissue an instruction fetch request, however, the branch condition and the address of the branch destination need to be fixed. Further, even if the branch conditions are fixed and it is known that the branch prediction has failed, an instruction fetch request cannot be reissued unless the address of the branch destination is determined. During this time period, unfortunately, the instruction fetch control unit keeps issuing needless instruction fetch requests.

As previously described, instructions thrown into the execution pipeline based on erroneous prediction need to be removed from the pipeline when the branch prediction fails. In order to do this, the branch instruction for which the branch prediction has filed must come to an end first. Since instructions are completed in the in-order sequence, however, the instructions thrown into the execution pipeline cannot be removed from the pipeline unless the instructions preceding the branch instruction all come to an end. If the completion of the branch instruction for which branch prediction has failed is delayed, the instructions erroneously thrown into the execution pipeline may cause needless operand requests to be issued.

SUMMARY OF THE INVENTION

It is a general object of the present invention to provide an instruction control method, an instruction fetch method, and an apparatus therefor that substantially obviate one or more problems caused by the limitations and disadvantages of the related art.

It is another and more specific object of the present invention to provide an instruction control method, an instruction fetch method, and an apparatus therefor that suppress or nullify erroneous instruction fetch requests and/or operand requests when branch prediction fails until a reissue instruction fetch request is issued to the memory.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an instruction control method, an instruction fetch method, and an apparatus therefore particularly pointed out in the specification in such full, clear, concise, and exact terms as to enable a person having ordinary skill in the art to practice the invention.

To achieve these and other advantages in accordance with the purpose of the invention, the invention provides an apparatus for controlling instructions, which includes an instruction fetch control unit configured to exercise such control as to fetch instructions from a memory unit storing the instructions therein that are to be executed according to an out-of-order method, an instruction buffer configured to store temporarily the instructions supplied from the memory unit, an instruction decoder configured to decode the instructions supplied from the instruction buffer, a branch instruction prediction unit configured to make branch prediction with respect to an instruction, and a branch prediction control unit configured to control the instruction fetch control unit, the instruction buffer, the instruction decoder, and the branch instruction prediction unit, wherein when the branch prediction control unit ascertains that the branch prediction by the branch instruction prediction unit is erroneous, the branch prediction control unit outputs to the instruction fetch control unit a signal for suppressing an instruction fetch request already supplied to the memory unit and outputs to the instruction buffer a signal for nullifying the instruction buffer during a period between a point in time at which the ascertainment is made by the branch prediction control unit that the branch prediction by the branch instruction prediction unit is erroneous and a point in time at which the instruction buffer fetches a correct instruction from the memory unit.

According to at least one embodiment of the present invention, when it is known that the branch prediction has failed, and when the conditions for issuing a reissue instruction fetch request are not determined, a cancel signal for nullifying instruction fetch requests is supplied to the cache control unit, and a notice is sent to the decoder unit to suspend the issuing of instructions until all the conditions for issuing a reissue instruction fetch request are satisfied.

According to another aspect of the present invention, an apparatus for controlling instructions includes an instruction fetch control unit configured to exercise such control as to fetch instructions from a memory unit storing the instructions therein that are to be executed according to an out-of-order method, an instruction buffer configured to store temporarily the instructions supplied from the memory unit, an instruction decoder configured to decode the instructions supplied from the instruction buffer, a branch instruction prediction unit configured to make branch prediction with respect to an instruction, and a branch instruction prediction control unit configured to control the instruction fetch control unit, the instruction buffer, the instruction decoder, and the branch instruction prediction unit, wherein when the branch prediction control unit ascertains that the branch prediction by the branch instruction prediction unit is erroneous, the branch prediction control unit outputs to the memory unit a signal for nullifying one or more operand requests resulting from the instructions prepared for execution due to the erroneous branch prediction made by the branch instruction prediction unit and outputs to the instruction buffer a signal for nullifying the instruction buffer during a period between a point in time at which the ascertainment is made by the branch prediction control unit that the branch prediction by the branch instruction prediction unit is erroneous and a point in time at which the instruction buffer fetches a correct instruction from the memory unit.

According to at least one embodiment of the present invention, the cancel signal for nullifying instruction fetch requests is issued, and, also, a cancel signal for suppressing needless operand fetch requests is supplied to the cache control unit.

Further, the identifiers of instructions erroneously prepared in the execution pipeline are reported to the cache control unit, making it possible for the cache control unit to check whether a demanded operand fetch request is a necessary one or a needless one. In this manner, provision is made in the present invention such that the cancel signals for suppressing needless instruction fetch requests and/or operand requests are supplied from the branch instruction control unit to the instruction fetch control unit and the cache control unit, thereby suspending the preparation of instructions until a reissue instruction fetch is completed. This can suppress pointless replacement in the cache unit, thereby improvising the performance of the processor.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

Figure 1:
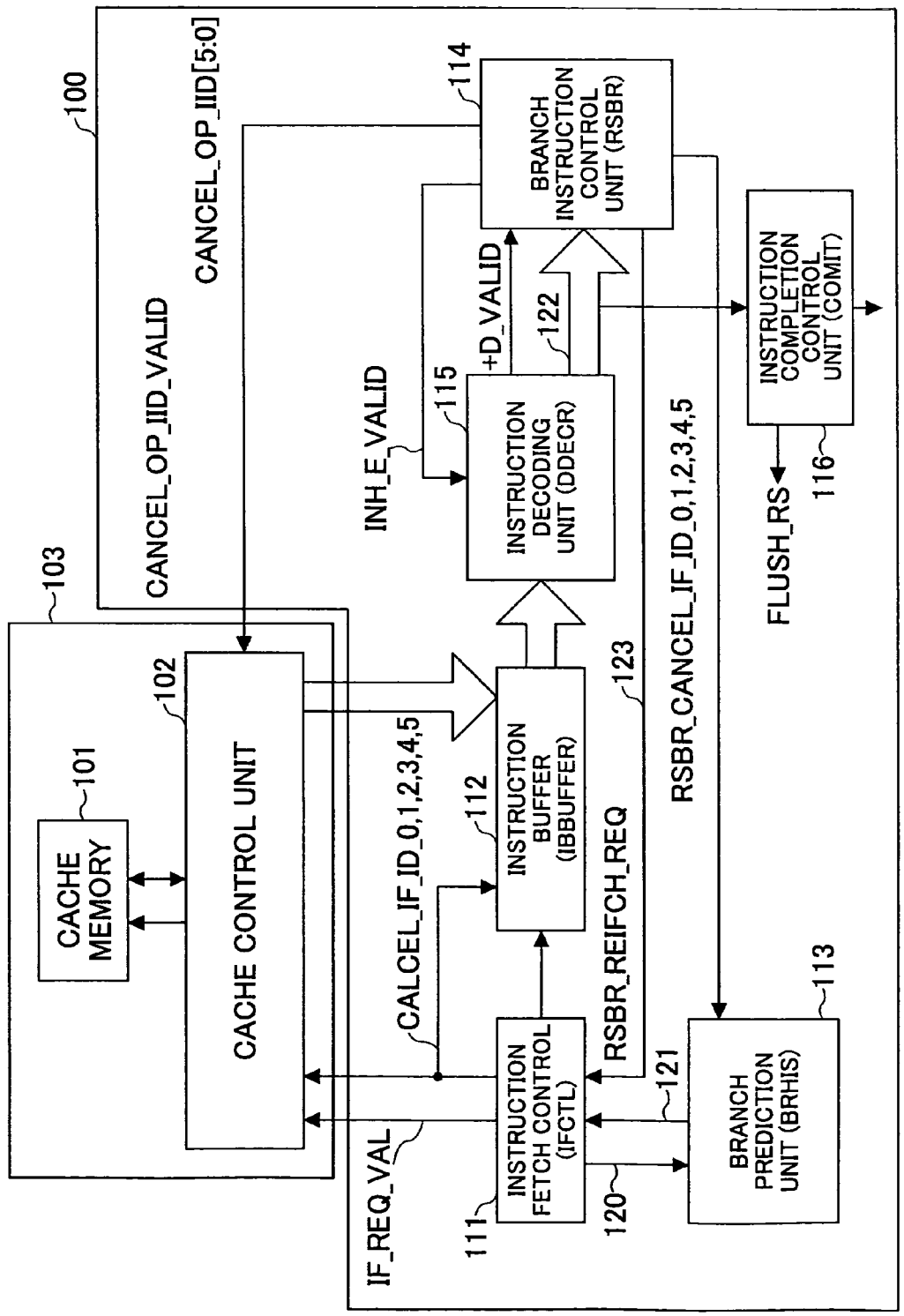
FIG. 1 is a block diagram showing portion for performing a branch instruction control operation in an instruction control unit of the central processing unit of a computer according to an embodiment of the present invention.

FIG. 1 is a block diagram showing portion for performing a branch instruction control operation in an instruction control unit 100 (instruction unit) of the central processing unit of a computer according to an embodiment of the present invention. The instruction control unit 100 is coupled to a memory unit 103 which includes a cache memory 101 and a cache control unit 102. The portion for performing a branch instruction control operation in the instruction control unit (instruction unit) 100 includes an instruction fetch control (IFCTL) 111, an instruction buffer (IBBUFFER) 112, a branch prediction unit (BRHIS) 113, a branch instruction control unit (RSBR) 114, an instruction decoding unit (DDECR) 115, and an instruction completion control unit (COMIT) 116. The instruction control unit 100 controls an instruction fetch from the cache memory 101 via the cache control unit 102. In the instruction control unit 100, instructions are executed according to the out-of-order control method.

In the instruction control unit 100 according to the present embodiment, flags (instruction ID or IID) indicating the order of instructions in the execution pipeline are assigned to all the instructions existing in the execution pipeline. Although instructions in the execution pipeline are executed according to the out-of-order control method, the instructions are completed according to the in-order control method based on the IIDs at the time of completion of the instructions.

First, an outline of the operation of the construction shown in FIG. 1 will be described.

The instruction fetch control 111 supplies an instruction fetch request (IF_REQ_VAL) such as an address to the cache control unit 102. In response, an instruction stored in the cache memory 101 is read through the cache control unit 102. The fetched instruction is then supplied from the cache control unit 102 to the instruction buffer 112 for storage therein.

The instruction fetch control 111 also supplies the above-noted address to the branch prediction unit 113 via a signal 120. When the instruction fetch is performed by the instruction fetch control 111, the branch prediction unit 113 makes branch prediction based on the instruction fetch address. If branching is predicted according to the branch prediction, the instruction is attached with a flag (+BRHIS_HIT=1) indicative of "branching" as an indication of branch prediction, and is supplied to the instruction fetch control 111 via a signal 121, followed by being provided to the instruction decoding unit 115 via the instruction fetch control 111 and the instruction buffer 112. The instruction for which branch predication is made in this manner is supplied from the instruction fetch control 111 to the instruction buffer 112 for storage therein.

The instruction buffer 112 supplies the stored instruction to the instruction decoding unit 115.

The instruction decoding unit 115 decodes the instruction supplied from the instruction buffer 112.

When the instruction decoding unit 115 decodes instructions, instructions that are ascertained to be branch instructions or those for which branching is predicted are entered into the branch instruction control unit 114 and the instruction completion control unit 116. Regardless of the decoding results of the instruction decoding unit 115, all the instructions thrown into the execution pipeline are entered into the instruction completion control unit 116.

The instruction decoding unit 115 throw instructions into the execution pipeline, and assigns the flags (instruction IDs or IIDs) indicating the order of instructions in the execution pipeline to all the instructions.

At the time of a branch check or at the time of failure of branch prediction, the branch instruction control unit 114 transmits a reissue instruction fetch request (RSBR_RE-IFCH_REQ) to the instruction fetch control 111. The branch instruction control unit 114 can resister and control a plurality of branch instructions (entries) existing in the execution pipeline. Each entry is controlled by use of the flag IID indicating the ordinal position of the instruction in the execution pipeline. When control by the branch instruction control unit 114 comes to an end with respect to an instruction, such instruction is released from the branch instruction control unit 114. Until the completion of the instruction, the instruction is controlled by the instruction completion control unit 116. The instruction completion control unit 116 controls the completion of instructions with respect to all the instructions existing in the execution pipeline. All the instructions in the execution pipeline are controlled based on their IIDs. These instructions are completed in the sequence according to the in-order control as conditions for the completion of instructions are satisfied.

Figure 2:
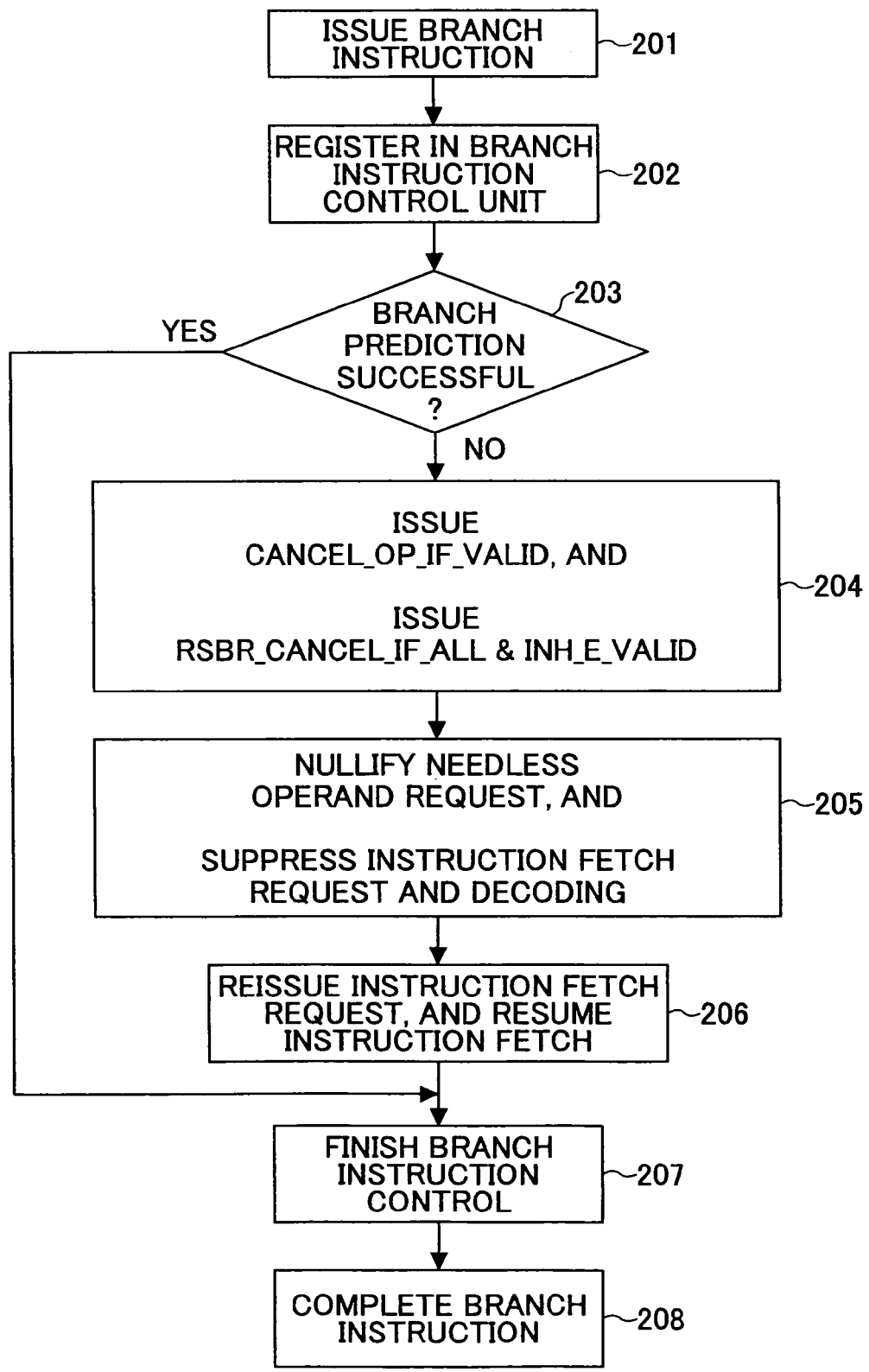
FIG. 2 is a flowchart showing the operation of an embodiment of the present invention.

In the following, a description will be given of the operation of the embodiment of the present invention with reference to FIG. 2. FIG. 2 is a flowchart showing the operation of the embodiment of the present invention.

At step S201 of FIG. 2, the instruction decoding unit 115 supplies a branch instruction to the branch instruction control unit 114 as described above.

At step S202, the branch instruction control unit 114 registers the branch instruction as described above. The branch instruction control unit 114 can register and control a plurality of branch instructions existing in the execution pipeline.

At step S203, a branch check is made. If it is found that the branch predication has failed, the procedure goes to step S204.

The check made by the branch instruction control unit 114 with respect to a branch instruction may find that the branch prediction by the branch prediction unit 113 has failed. Such finding may be obtained when one of the first and fourth conditions given in the following is satisfied.

The first condition is the case in which a branch instruction for which no branching is predicted turns out to be branching. The second condition is the case in which a branch instruction for which branching is predicted turns out to be not branching. The third condition is the case in which the address of a branch destination is incorrect with respect to a branch instruction for which branching is predicted. The fourth condition is the case in which an instruction that is not a branch instruction is predicted as branching as if it was a branch instruction.

In the following, logical expressions that satisfy the first through fourth conditions will be given.

The first condition is satisfied when +RSBR_VALID & −RSBR_BRHIS_HIT & +RSBR_RESOLVED & +RSBR_TAKEN is true.

The second condition is satisfied when +RSBR_VALID & +RSBR_BRHIS_HIT & +RSBR_RESOLVED & −RSBR_TAKEN is true.

The third condition is satisfied when +RSBR_VALID & +RSBR_BRHIS_HIT & +RSBR_TAV & −RSBR_TGTCP_MATCH is true.

The fourth condition is satisfied when +RSBR_PHANTOM_VALID is true.

Here, each signal has the following meaning.

(1) +RSBR_VALID indicates that an entry in the branch instruction control unit 114 is a branch instruction.

(2) +RSBR_BRHIS_HIT indicates that the above entry is predicted as "branching" by the branch prediction unit 113.

(3) +RSBR_RESOLVED indicates that the branch condition for the above entry is fixed.

(4) +RSBR_TAKEN indicates that the above entry is branching.

(5) +RSBR_TAV indicates that the branch address for the above entry is fixed.

(6) +RSBR_TGTCP_MATCH indicates that the predicted branch address for the above entry is a correct address.

(7) +RSBR_PHANTOM_VALID indicates that an instruction that is not a branch instruction is ascertained as branching as if it was a branch instruction.

"+" attached at the beginning of each signal name represents a positive logic, and "−" attached at the beginning of each signal name represents a negative logic. Namely, +RSBR_VALID described in the above item (1), for example, becomes positive if the corresponding entry is predicted as "branching" by the branch prediction unit 113. On the other hand, +RSBR_VALID becomes negative if the corresponding entry is predicted as "not branching" by the branch prediction unit 113. Further, the symbol "&" represents a logic product operation (AND operation).

If any one of the above identified conditions is satisfied, the procedure goes to step S204.

At step S204, the following control operations are simultaneously performed.

The branch instruction control unit 114 transmits a signal RSBR_CANCEL_IF_ID_0,1,2,3,4,5, thereby causing the instruction fetch control 111 to supply a signal CANCEL_IF_ID_0,1,2,3,4,5 to the cache control unit 102 to inform of the nullification of the instruction fetch request.

When this is done, the instruction fetch control 111 erases all the data existing in the instruction buffer 112. Here, the instruction buffer 112 is a memory mechanism for providing temporal storage for the data fetched from the memory until it is given to the instruction decoding unit 115. In this example, there are 6 ports.

The above signal is continuously transmitted until the branch instruction control unit 114 supplies a reissue instruction fetch request (RSBR_REIFCH_REQ) to the instruction fetch control 111 via a signal 123.

Further, RSBR entries following the instruction (entry) for which branch prediction has failed are removed so as to suppress a reissue instruction fetch request (RSBR_REIFCH_REQ) resulting from these entries.

The branch instruction control unit 114 transmits to the instruction decoding unit 115 a signal (INH_E_VALID) for suppressing the entry of an instruction into the execution pipeline. This signal is continuously transmitted until the needless instructions thrown into the execution pipeline based on the erroneous branch prediction are removed from the execution pipeline (namely, until the branch instruction for which the branch prediction has failed is completed). The completion of the branch instruction results in a signal FLUSH_RS being supplied from the instruction completion control unit 116 to each instruction control unit, which causes the instructions to be removed from the execution pipeline.

At the same time, the branch instruction control unit 114 transmits to the cache control unit 102 a signal (CANCEL_OP_IID_VALID) indicating the invalid status of needless operand requests. Simultaneously with this, the branch instruction control unit 114 notifies the cache control unit 102 of IIDs (CANCEL_OP_IID[5:0]) of instructions following the branch instruction for which the branch prediction has failed. This is done for the purpose of discriminating the operand requests resulting from the needless instructions thrown into the execution pipeline based on the erroneous branch prediction from the operand requests resulting from the instructions that were in existence in the execution pipeline prior to the branch instruction.

This signal (CANCEL_OP_IID[5:0]) is continuously transmitted until the needless instructions thrown into the execution pipeline based on the erroneous branch prediction are removed from the execution pipeline.

The procedure then proceeds to step S205. Since such control was exercised at step S204 that each signal is generated, at step S205, instruction fetch requests are invalid in the cache control unit while all of the CANCEL_IF_ID_0,1,2,3,4,5 are 1. While CANCEL_OP_IID_VALID is 1, further, operand requests are nullified as long as they come from the instructions following the IID indicated by CANCEL_OP_IID[5:0] in the execution pipeline.

At step S206, the branch instruction control unit 114 supplies a reissue instruction fetch request (RSBR_REIFCH_REQ) to the instruction fetch control 111, which results in a reissue instruction fetch being started.

Proceeding to step S207, the branch instruction control unit 114 brings an end to the branch instruction control.

If it is ascertained at step S203 that the branch prediction is successful, the procedure goes from step S203 to step S207.

At step S208, which is the last step, the branch instruction is completed.

As described above, the present invention suppresses needless instruction fetch requests and operand requests after a failure of branch prediction is detected until a correct instruction sequence is fetched again. This avoids pointless issuance of instructions to the execution pipeline, thereby preventing needless replacement from occurring in the cache and preventing instruction control resources such as computing units from being consumed needlessly. The performance of the instruction processing apparatus can thus be improved.

In the following, circuits for generating the control signals RSBR_CANCEL_IF_ID_0,1,2,3,4,5, RSBR_REIFCH_REQ, INH_E_VALID, CANCEL_OP_IID_VALID, and CANCEL_OP_IID[5:0] according to the present invention will be described.

Figure 13:
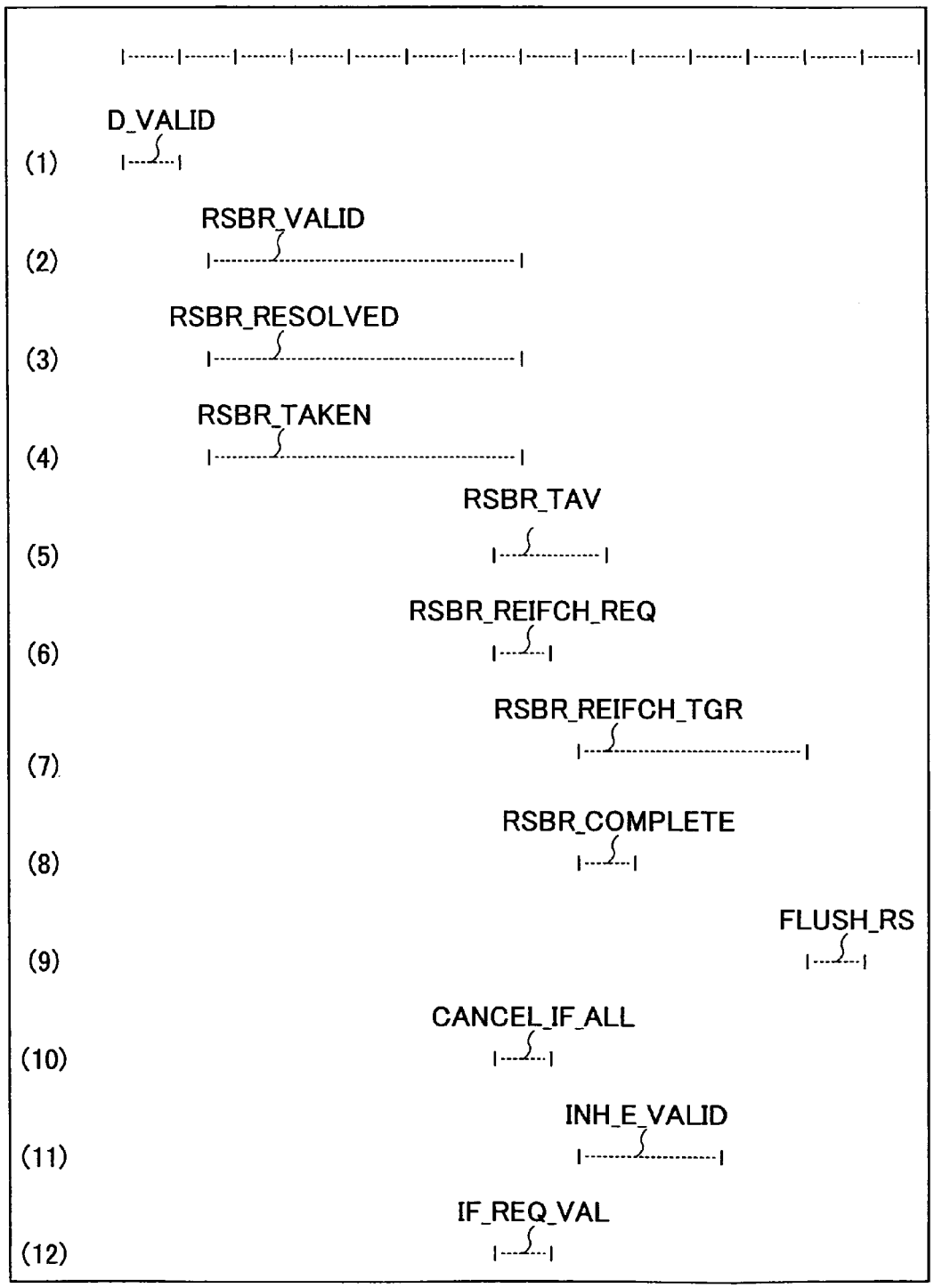
FIG. 13 is a timing chart showing related-art branch control.
Figure 14:
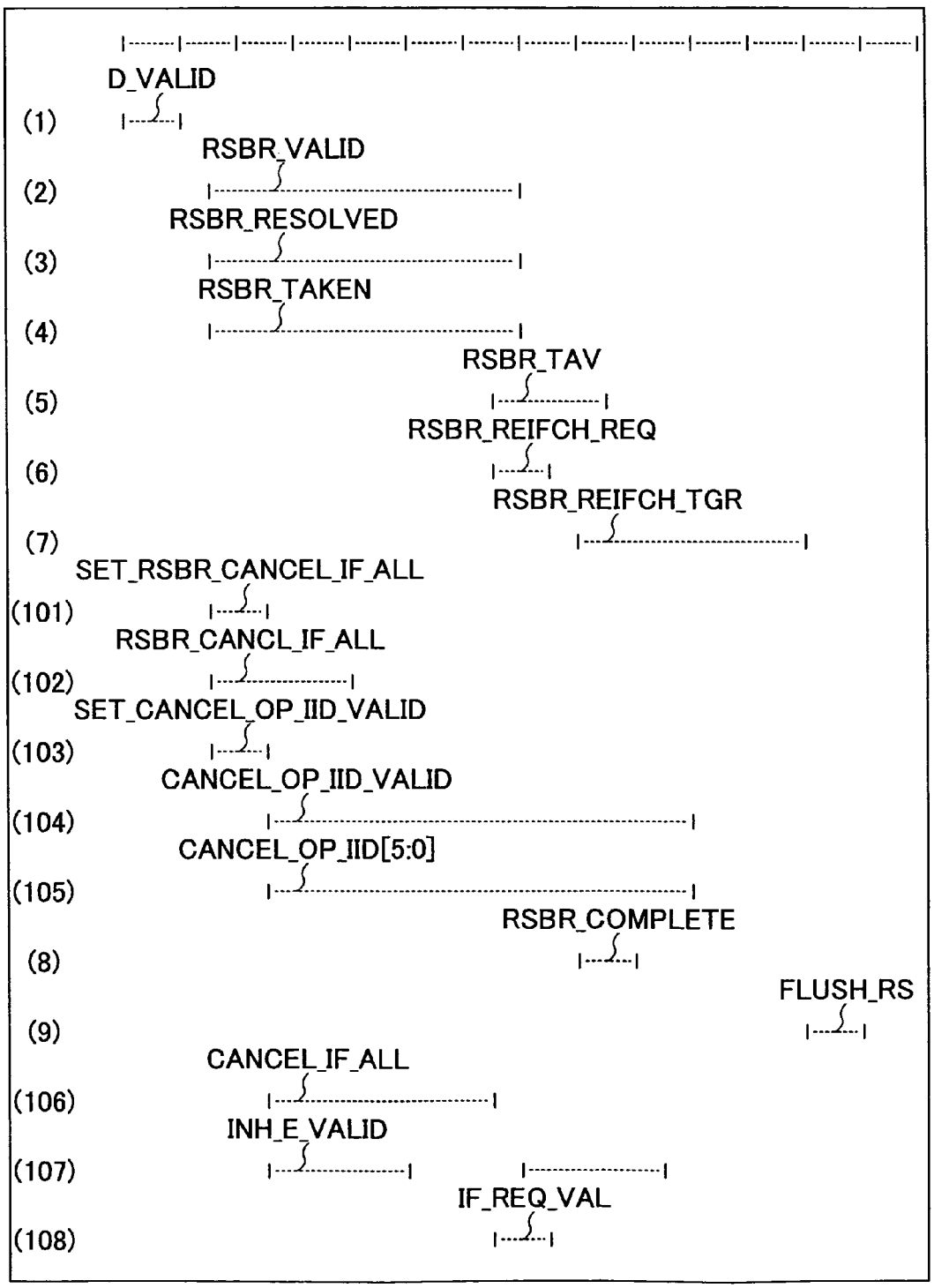
FIG. 14 is a timing chart showing signals generated according to the present invention.

FIG. 3 through FIG. 12 illustrate embodiments of the circuits for generating the above-noted control signals. FIG. 13 is a timing chart showing control signals relating to a related-art branch instruction control unit 114. FIG. 14 is a timing chart showing the control signals of the branch instruction control unit 114 that include the above-noted control signals according to the present invention.

First, the circuits for generating the control signals illustrated in FIG. 3 through FIG. 12 will be described.

Figure 3:
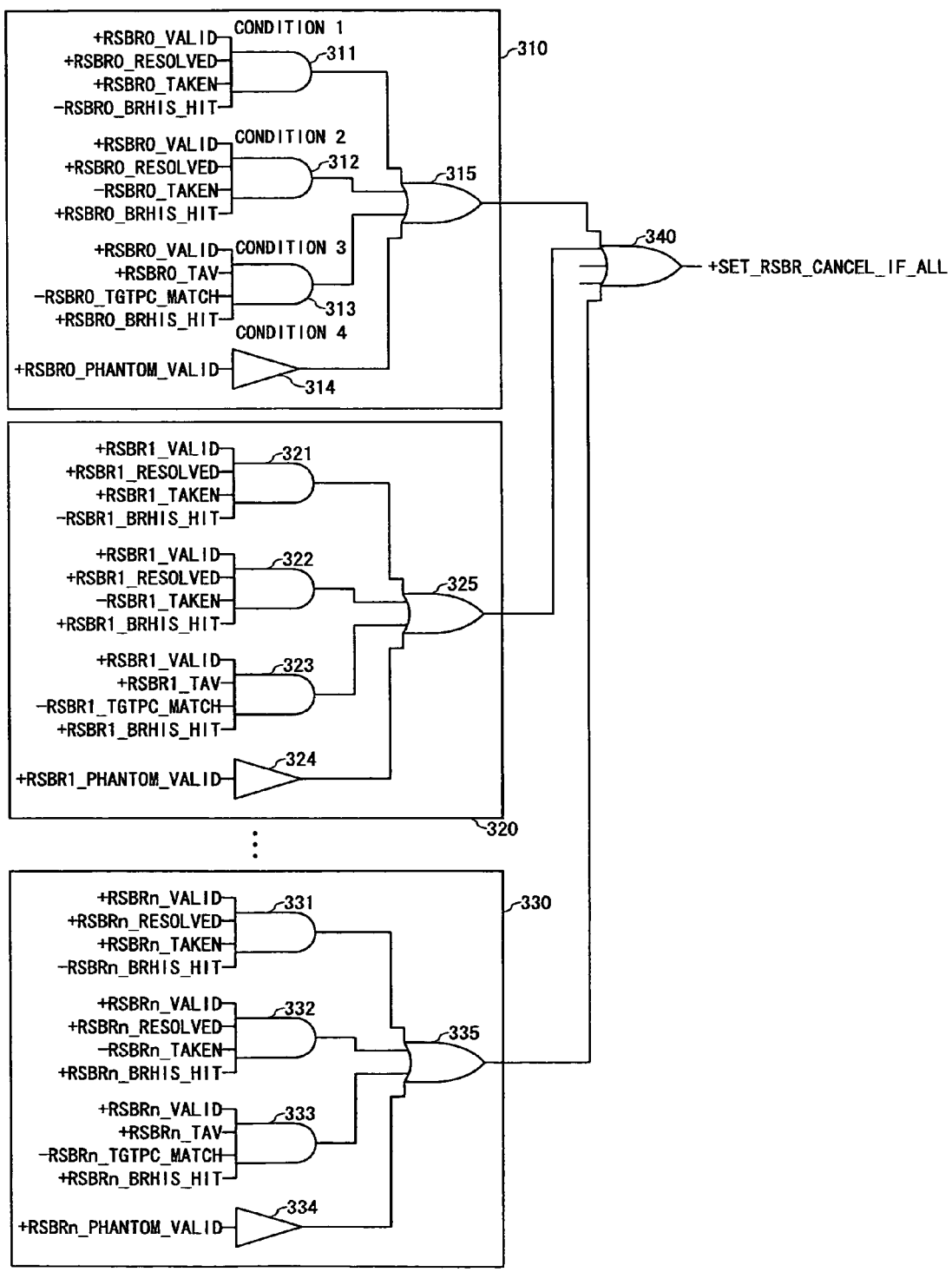
FIG. 3 is a drawing showing a portion of a circuit for generating a control signal according to the present invention.

FIG. 3 is a drawing showing a circuit for generating a signal (+SET_RSBR_CANCEL_IF_ID_0,1,2,3,4,5) that serves to set RSBR_CANCEL_IF_ID_0,1,2,3,4,5. In this circuit diagram, "ALL" represents ID_0,1,2,3,4,5.

The construction shown in FIG. 3 includes circuit blocks 310, 320, and 330 and a multi-input OR gate 340. The circuit block 310 includes a 4-input AND gate 311, a 4-input AND gate 312, a 4-input AND gate 313, a buffer 314, and a 4-input OR gate 315. The circuit blocks 320 and 330 have the same construction as the circuit block 310. Signals input into each circuit block correspond to an instruction (entry) registered in the branch instruction control unit 114. The circuit block 310, for example, corresponds to an instruction (entry) having the IID "0". The circuit block 320 corresponds to an instruction (entry) having the IID "1". The circuit block 330 corresponds to an instruction (entry) having the IID "n".

The 4-input AND gate 311 of the circuit block 310 serves to decode the first condition previously described. The 4-input AND gate 311 of the circuit block 310 receives +RSBR0_VALID, +RSBR0_RESOLVED, +RSBR_TAKEN, and −RSBR_BRHIS_HIT. When all the inputs are 1, the 4-input AND gate 311 produces an output that is 1. This corresponds to the case in which the first condition is satisfied.

The 4-input AND gate 312 of the circuit block 310 serves to decode the second condition previously described. The 4-input AND gate 312 of the circuit block 310 receives +RSBR_VALID, +RSBR_RESOLVED, −RSBR_TAKEN, and +RSBR_BRHIS_HIT. When all the inputs are 1, the 4-input AND gate 312 produces an output that is 1. This corresponds to the case in which the second condition is satisfied.

The 4-input AND gate 313 of the circuit block 310 serves to decode the third condition previously described. The 4-input AND gate 313 of the circuit block 310 receives +RSBR_VALID, +RSBR_TAV, −RSBR_TGTCP_MATCH, and +RSBR_BRHIS_HIT. When all the inputs are 1, the 4-input AND gate 313 produces an output that is 1. This corresponds to the case in which the third condition is satisfied.

The buffer 314 of the circuit block 310 serves to decode the fourth condition previously described. The buffer 314 of the circuit block 310 receives +RSBR_PHANTOM_VALID. When the input is 1, the buffer 314 produces an output that is 1. This corresponds to the case in which the fourth condition is satisfied.

In the circuit block 310, if one of the outputs of the 4-input AND gate 311, the 4-input AND gate 312, the 4-input AND gate 313, and the buffer 314 is "1", the 4-input OR gate 315 produces an output that is "1".

The same applies in the case of the circuit blocks 320 and 330. If one of the outputs of the circuit blocks 310, 320, and 330 is "1", the OR gate 340 produces an output that is "1". As a result, SET_RSBR_CANCEL_IF_ALL is set to "1".

Figure 4:
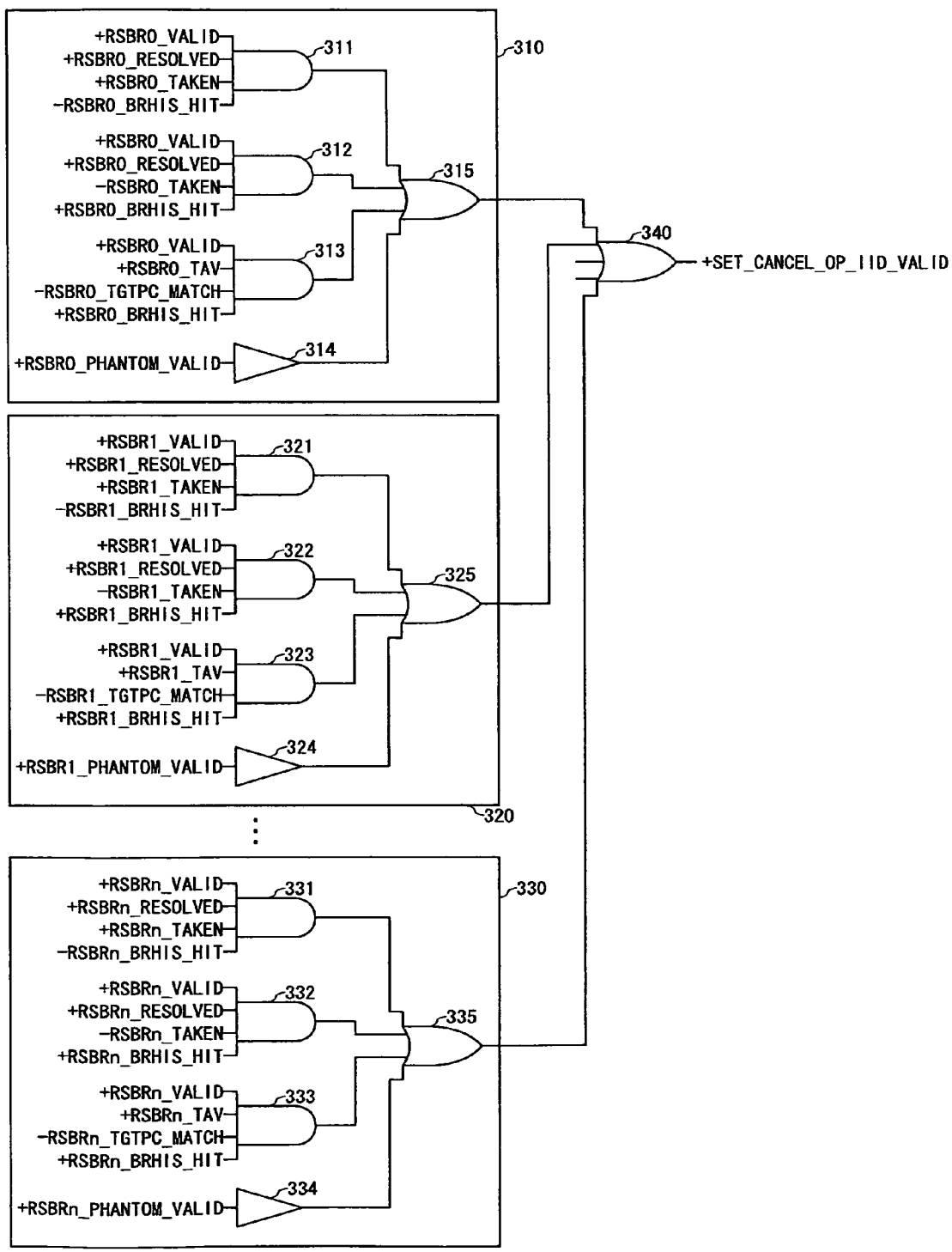
FIG. 4 is a drawing showing a portion of a circuit for generating a control signal according to the present invention.

FIG. 4 shows the same construction as that of FIG. 3, and generates +SET_CANCEL_OP_IID_VALID for setting CANCEL_OP_IID_VALID.

Figure 5:
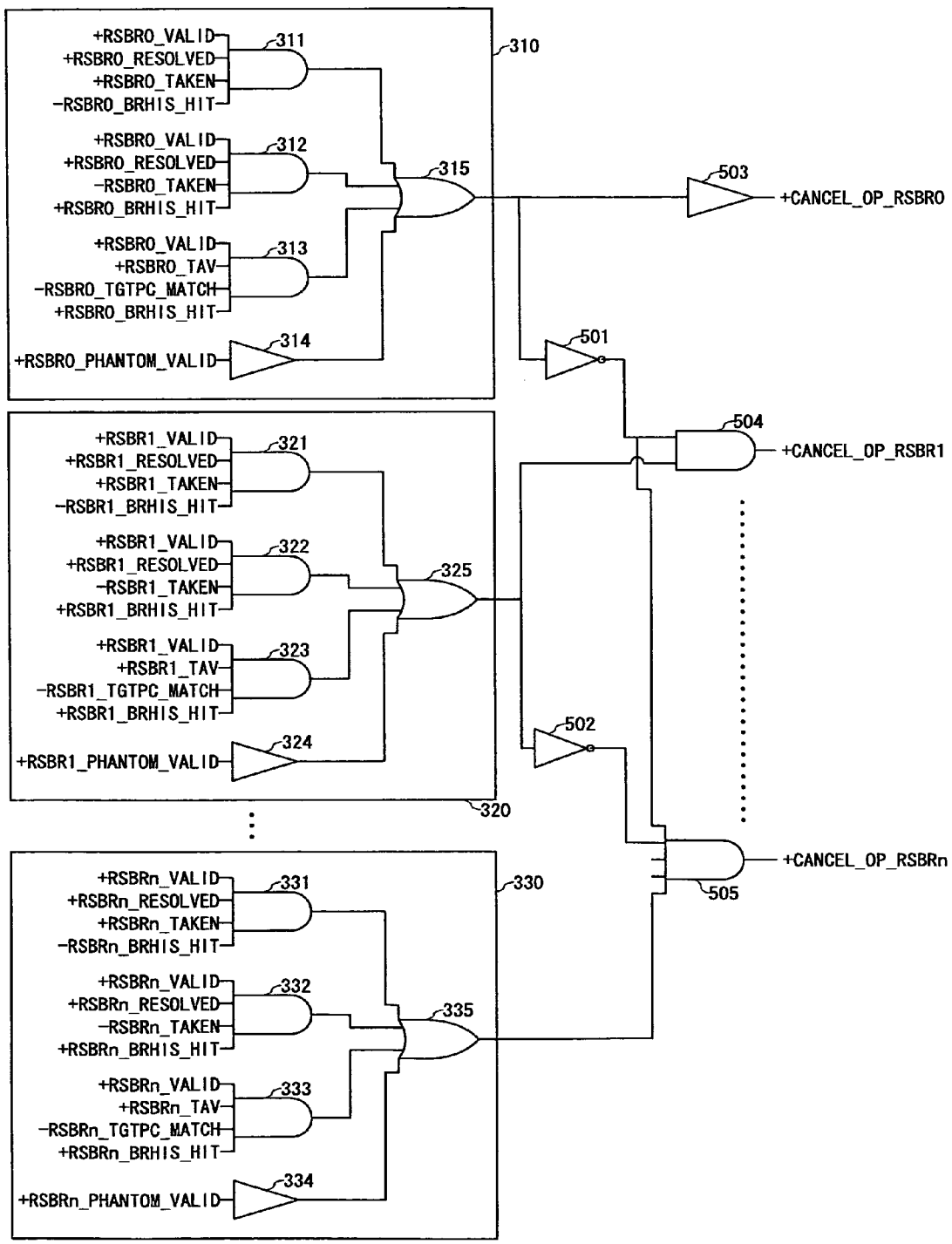
FIG. 5 is a drawing showing a portion of a circuit for generating a control signal according to the present invention.

The construction shown in FIG. 5 includes the circuits 310 through 330 the same as those shown in FIG. 3, inverters 501 and 502, a buffer 503, and AND gates 504 and 505. The construction of FIG. 5 generates intermediate signals +CANCEL_OP_RSBR0, +CANCEL_OP_RSBR1, and +CANCEL_OP_RSBRn. These signals indicate signals following the instruction for which branch prediction has failed. +CANCEL_OP_RSBR0 is identical to the output of the circuit 310. +CANCEL_OP_RSBR1 is obtained by performing an AND operation by the AND gate 504 between an inverse of the output of the circuit 310 as obtained by the inverter 501 and the output of the circuit 320. Further, +CANCEL_OP_RSBRn is obtained by the AND gate 505 in a similar manner.

Figure 6:
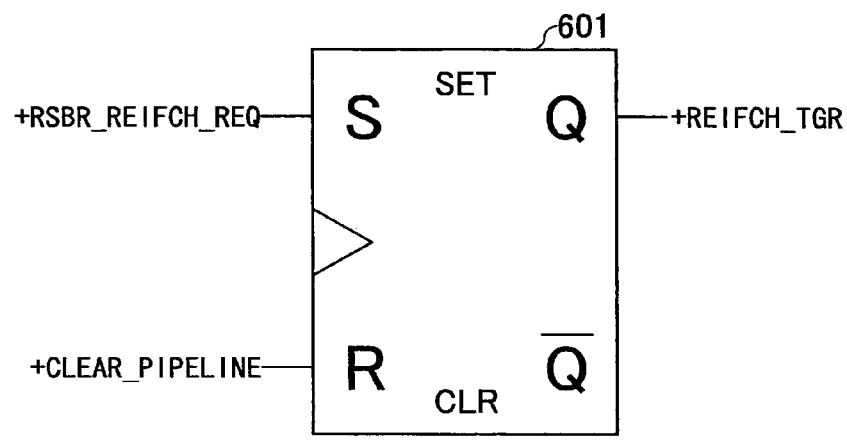
FIG. 6 is a drawing showing a portion of a circuit for generating a control signal according to the present invention.

FIG. 6 is a drawing showing the circuit for generating +REIFCH_TRG comprised of an RS flip-flop 601. +REIFCH_TRG that is the output of the RS flip-flop 601 is set by a reissue instruction fetch request (+RSBR_REIFCH_REQ) input into the set terminal (S) of the RS flip-flop 601. +REIFCH_TRG is reset by a +CLEAR_PIPELINE signal that is input into the reset terminal (R) of the RS flip-flop 601. The +CLEAR_PIPELINE signal serves to instruct to clear the execution pipeline, and is supplied by the instruction completion control unit 116.

Figure 7:
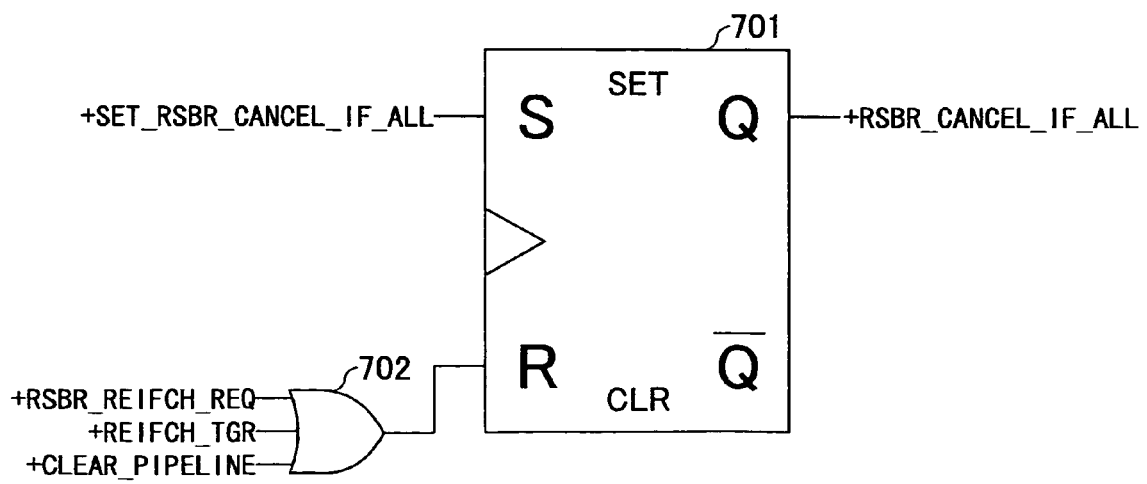
FIG. 7 is a drawing showing a portion of a circuit for generating a control signal according to the present invention.

FIG. 7 is a drawing showing the circuit for generating +RSBR_CANCEL_IF_ALL comprised of an RS flip-flop 701. The symbol "ALL" represents ID_0,1,2,3,4,5. +RSBR_CANCEL_IF_ALL that is the output of the RS flip-flop 701 is set by +SET_RSBR_CANCEL_IF_ALL supplied from the OR gate 340 of FIG. 3 to the set terminal (S) of the RS flip-flop 701. An OR gate 720 is connected to the reset terminal (R) of the RS flip-flop 701. The OR gate 720 receives as its three inputs the reissue instruction fetch request (+RSBR_REIFCH_REQ), +REIFCH_TRG output from the RS flip-flop 601 of FIG. 6, and the +CLEAR_PIPELINE signal. If one of the reissue instruction fetch request (+RSBR_REIFCH_REQ), +REIFCH_TRG output from the RS flip-flop 601 of FIG. 6, and the +CLEAR_PIPELINE signal is "1", the reset terminal (R) of the RS flip-flop 701 receives a reset signal from the OR gate 720, resulting in +RSBR_CANCEL_IF_ALL being reset.

Figure 8:
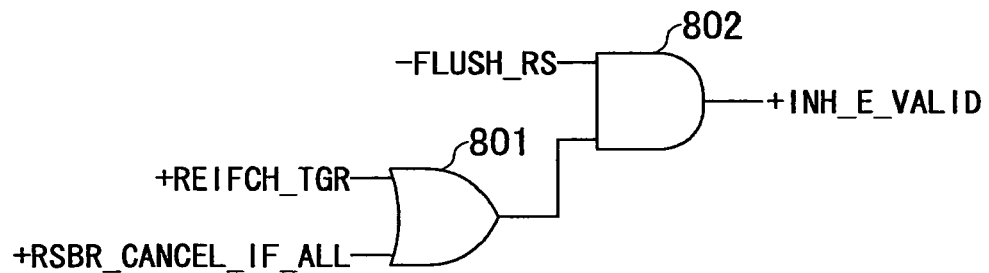
FIG. 8 is a drawing showing a portion of a circuit for generating a control signal according to the present invention.

FIG. 8 is a drawing showing the circuit for outputting +INH_E_VALID comprised of a 2-input OR gate 801 and a 2-input AND gate 802. The +REIFCH_TRG signal output from the RS flip-flop 601 of FIG. 6 and the +RSBR_CANCEL_IF_ALL signal output from the RS flip-flop 701 of FIG. 7 are subjected to an OR operation by the OR gate 801. The output of the OR gate 801 and the −FLUSH_RS signal output from the instruction completion control unit 116 are subjected to an AND operation by the AND gate 802, thereby outputting +INH_E_VALID. The −FLUSH_RS signal is a negative logic signal of the +FLUSH_RS signal that is output from the instruction completion control unit 116 in FIG. 1.

Figure 9:
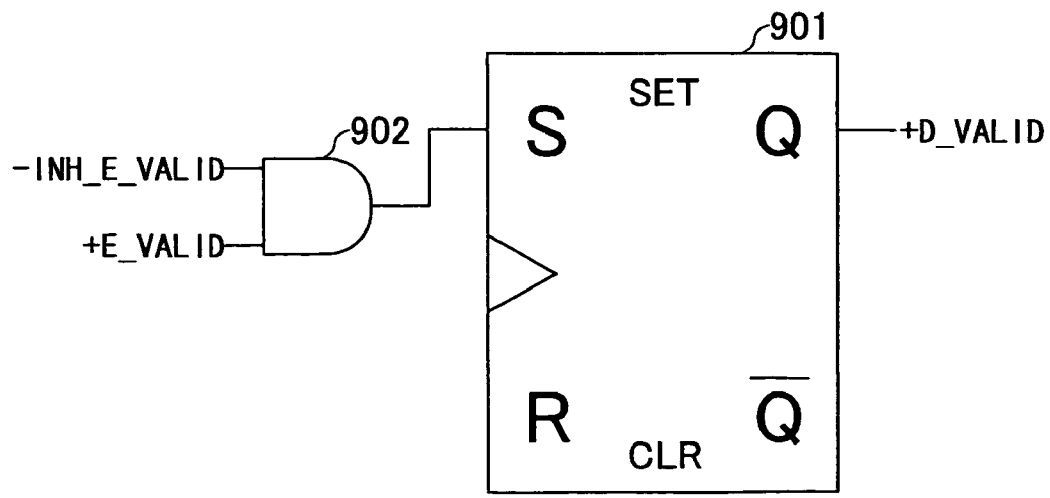
FIG. 9 is a drawing showing a portion of a circuit for generating a control signal according to the present invention.

FIG. 9 is a drawing showing the circuit for generating +D_VALID comprised of an RS flip-flop 901 and a 2-input AND gate 902. The output of the 2-input AND gate 902 is connected to the set terminal (S) of the RS flip-flop 901. The 2-input AND gate 902 performs an AND operation between the +E_VALID signal and −INH_E_VALID that is a negative logic of +INH_E_VALID output from the AND gate 802 of FIG. 8. The output of the AND gate 902 serves to set the +D_VALID signal that is output from the RS flip-flop 901. The +D_VALID signal serves to indicate the start of a decoding cycle, and is supplied from the instruction decoding unit 115 to the branch instruction control unit 114 and the instruction completion control unit 116. Further, the +E_VALID signal serves to indicate timing at which the instruction buffer 112 sets the instruction decoding unit 115.

Figure 10:
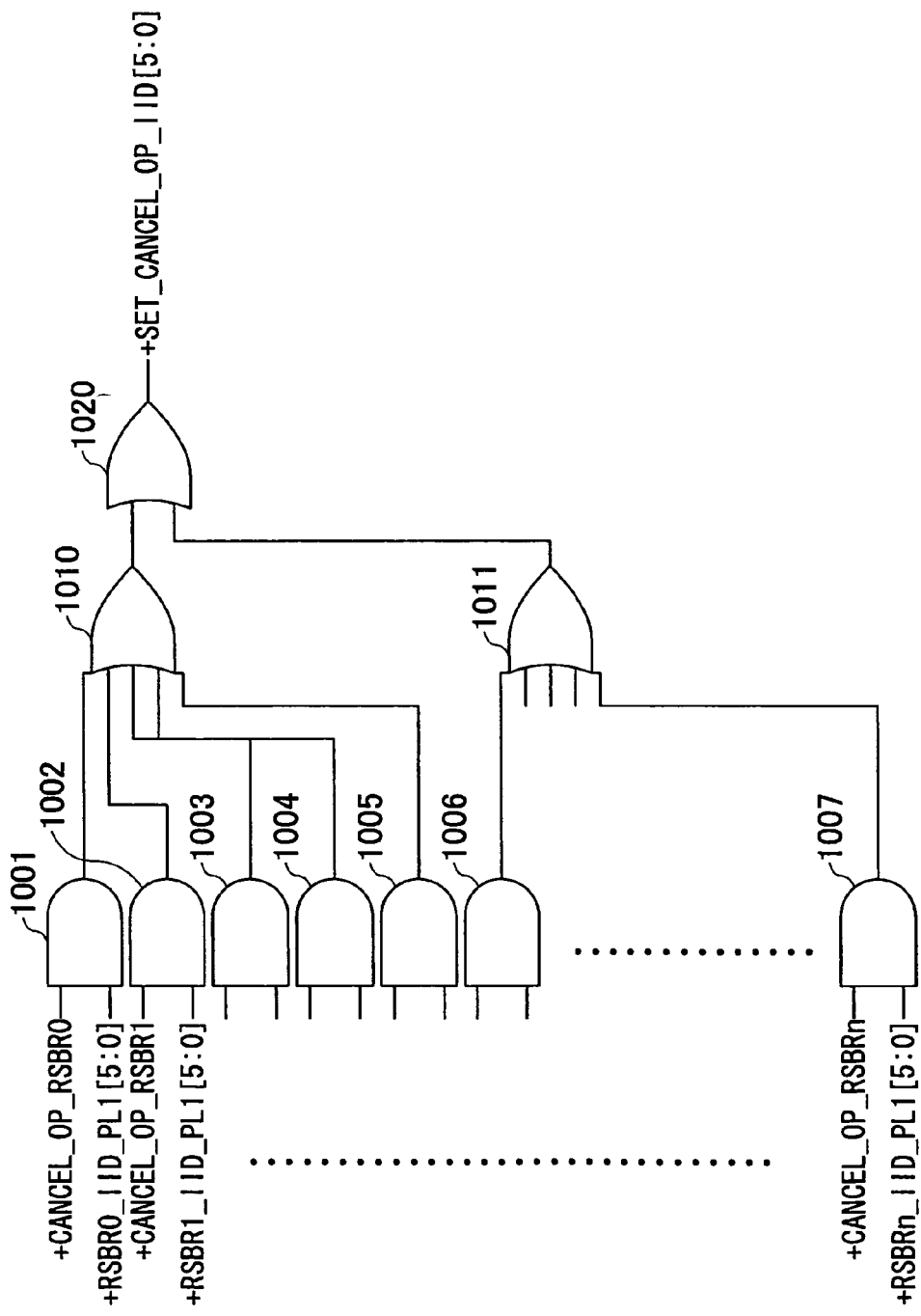
FIG. 10 is a drawing showing a portion of a circuit for generating a control signal according to the present invention.

FIG. 10 is a drawing showing the circuit for generating +SET_CANCEL_OP_IID[5:0] for setting CANCEL_OP_IID[5:0]. The circuit shown in FIG. 10 includes 2-input AND gates 1001 through 1007, 5-input OR gates 1010 and 1011, and a 2-input OR gate 1020.

The 2-input AND gate 1001 receives +CANCEL_OP_RSBR0 supplied from the inverter 503 of FIG. 5 and +RSBR0_IID_PL1[5:0] of the instruction ID (IID). The 2-input AND gate 1002 receives +CANCEL_OP_RSBR1 supplied from the two-input AND gate 504 of FIG. 5 and +RSBR1_IID_PL1[5:0] of the instruction ID. The 2-input AND gate 1007 receives +CANCEL_OP_RSBRn supplied from the two-input AND gate 505 of FIG. 5 and +RSBRn_IID_PL1[5:0] of the instruction ID. The 2-input OR gate 1020 outputs the instruction ID of the instruction immediately following the branch instruction for which branch prediction has failed.

Figure 11:
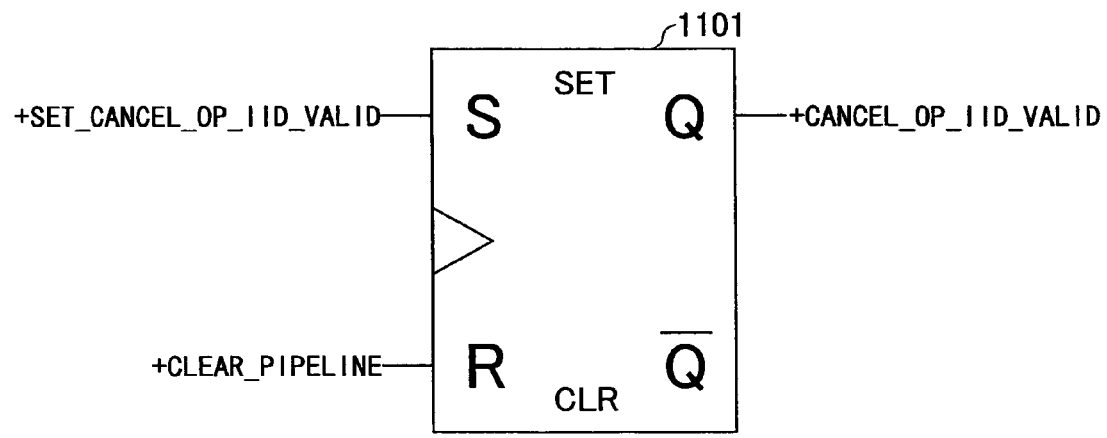
FIG. 11 is a drawing showing a portion of a circuit for generating a control signal according to the present invention.

FIG. 11 is a drawing showing the circuit for generating +CANCEL_OP_IID_VALID comprised of an RS flip-flop 1101. The set input terminal (S) of the RS flip-flop 1101 receives SET CANCEL_OP_IID_VALID that is output from the OR gate 340 of FIG. 4, so that +CANCEL_OP_IID_VALID is set by this set input signal. The reset input terminal (R) of the RS flip-flop 1101 receives +CLEAR_PIPELINE, so that +CANCEL_OP_IID_VALID is reset by this reset input signal. The +CLEAR_PIPELINE signal serves to instruct to clear the execution pipeline, and is supplied by the instruction completion control unit 116

Figure 12:
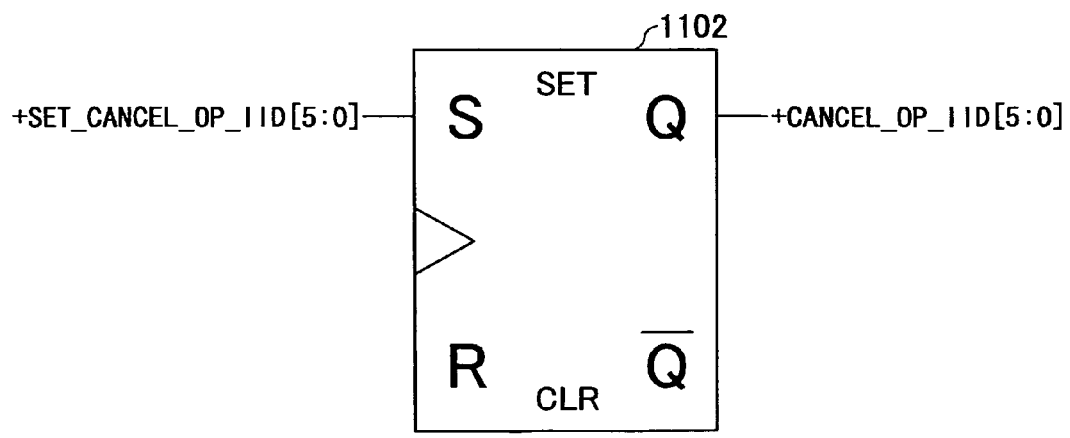
FIG. 12 is a drawing showing a portion of a circuit for generating a control signal according to the present invention.

FIG. 12 is a drawing showing the circuit for outputting +CANCEL_OP_IID[5:0] comprised of a RS flip-flop 1201. The set terminal (S) of the RS flip-flop 1201 receives the SET_CANCEL_OP_IID[5:0] signal that is output from the OR gate 1020 of FIG. 10, so that +CANCEL_OP_IID[5:0] is set by this set input signal.

In the manner as described above, the control signals RSBR_CANCEL_IF_ID_0,1,2,3,4,5, RSBR_REIFCH_REQ, INH_E_VALID, CANCEL_OP_IID_VALID, and CANCEL_OP_IID[5:0] can be generated.

In the following, the timing of the signals generated according to the present invention will be described.

FIG. 13 is a timing chart showing the timing of related-art branch control. FIG. 14 is a timing chart showing the timing of the signals generated according to the present invention.

In FIG. 13, D_VALID shown as (1) indicates the start of a decoding cycle, and is supplied from the instruction decoding unit 115 to the branch instruction control unit 114 and the instruction completion control unit 116. With this D_VALID signal, the cycle commences. As illustrated from (2) to (12), the signals for controlling each part of FIG. 1 are generated as previously described.

In FIG. 14, the same signals as those of FIG. 13 are referred to by the same numbers. Signals shown in (101) through (108) generated according to the present invention are those which are generated by the circuits shown in FIG. 3 through FIG. 12 as described above.

In this manner, the circuits shown in FIG. 3 through FIG. 12 can generate the control signals RSBR_CANCEL_IF_ID_0, 1,2,3,4,5, RSBR_REIFCH_REQ, INH_E_VALID, CANCEL_OP_IID_VALID, and CANCEL_OP_IID[5:0]. With this provision, erroneous instruction fetch requests and operand requests can be suppressed or nullified when a branch prediction fails until a reissue instruction fetch request is issued to the memory.

Further, the present invention is not limited to these embodiments, but various variations and modifications may be made without departing from the scope of the present invention.

What is claimed is:

1. An apparatus for controlling instructions, comprising:
   an instruction fetch control unit configured to exercise such control as to fetch instructions from a memory unit storing the instructions therein that are to be executed according to an out-of-order method, the memory unit including a cache control unit and a cache memory having cache lines holding a fetched instruction respectively;
   an instruction buffer configured to store temporarily the instructions supplied from the memory unit;
   an instruction decoder configured to decode the instructions supplied from the instruction buffer;
   a branch instruction prediction unit configured to make branch prediction with respect to an instruction; and
   a branch prediction control unit configured to control the instruction fetch control unit, the instruction buffer, the instruction decoder, and the branch instruction prediction unit,
   wherein when the branch prediction control unit ascertains that the branch prediction by the branch instruction prediction unit is erroneous, the branch prediction control unit outputs to the instruction fetch control unit a cancellation signal suppressing an instruction fetch request already supplied to the memory unit thereby to cause the instruction fetch control unit to supply to the cache control unit a signal informing of nullification of the instruction fetch request and outputs to the instruction buffer the cancellation signal nullifying the instruction buffer during a time period between a point in time at which the ascertainment is made by the branch prediction control unit that the branch prediction by the branch instruction prediction unit is erroneous and a point in time at which the instruction buffer fetches a correct instruction from the memory unit, the cancellation signal starting to be output in response to said ascertainment and being continuously output for said time period until the fetching of the correct instruction;
   wherein the signal informing of nullification of the instruction fetch request having already been supplied to the cache control unit causes the cache control unit of the memory unit to nullify the instruction fetch request having already been supplied to the cache control unit and avoids replacement of the cache line in the cache memory caused by an instruction fetch operation corresponding to the instruction fetch request.

2. The apparatus as claimed in claim 1, wherein the branch prediction control unit ascertains that the branch prediction by the branch instruction prediction unit is erroneous in a case in which a branch instruction for which branching is predicted turns out to be not branching, in a case in which a branch instruction for which no branching is predicted turns out to be branching, in a case in which an instruction that is not a branch instruction is predicted as branching, or in a case in which an address of a branch destination is incorrect with respect to a branch instruction for which branching is predicted.

3. An apparatus for controlling instructions, comprising:
   an instruction fetch control unit configured to exercise such control as to fetch instructions from a memory unit storing the instructions therein that are to be executed according to an out-of-order method, the memory unit including a cache control unit and a cache memory having cache lines holding a fetched instruction including an operand respectively;
   an instruction buffer configured to store temporarily the instructions supplied from the memory unit;
   an instruction decoder configured to decode the instructions supplied from the instruction buffer;
   a branch instruction prediction unit configured to make branch prediction with respect to an instruction; and
   a branch prediction control unit configured to control the instruction fetch control unit, the instruction buffer, the instruction decoder, and the branch instruction prediction unit,
   wherein when the branch prediction control unit ascertains that the branch prediction by the branch instruction prediction unit is erroneous, the branch prediction control unit outputs to the cache control unit a first signal indicating an invalid status of one or more operand requests resulting from the instructions prepared for execution due to the erroneous branch prediction made by the branch instruction prediction unit and outputs to the instruction buffer a second signal nullifying the instruction buffer during a time period between a point in time at which the ascertainment is made by the branch prediction control unit that the branch prediction by the branch instruction prediction unit is erroneous and a point in time at which the instruction buffer fetches a correct instruction from the memory unit, the first signal and the second signal starting to be output in response to said ascertainment and being continuously output for said time period until the fetching of the correct instruction;

wherein the first signal indicating an invalid status of one or more operand requests having already been supplied to the cache control unit causes the cache control unit of the memory unit to nullify the one or more operand requests having already been supplied to the cache control unit, and avoids replacement of a cache line in the cache memory caused by an operand fetch operation corresponding to the one or more operand requests.

4. The apparatus as claimed in claim 3, wherein the branch prediction control unit ascertains that the branch prediction by the branch instruction prediction unit is erroneous in a case in which a branch instruction for which branching is predicted turns out to be not branching, in a case in which a branch instruction for which no branching is predicted turns out to be branching, in a case in which an instruction that is not a branch instruction is predicted as branching, or in a case in which an address of a branch destination is incorrect with respect to a branch instruction for which branching is predicted.

5. A method of controlling an instruction control apparatus which fetches instructions from a memory unit storing the instructions therein, and executes the instructions according to an out-of-order method, the memory unit including a cache control unit and a cache memory having cache lines holding a fetched instruction respectively, and which includes a branch instruction prediction unit configured to make branch prediction with respect to an instruction and a branch prediction control unit, said method comprising:
   suppressing an instruction fetch request already supplied to the memory unit; and
   outputting, to the cache control unit, a signal indicating an invalid status of one or more instructions already supplied from the memory unit,
   wherein said steps are performed when the branch prediction control unit ascertains that the branch prediction by the branch instruction prediction unit is erroneous, during a time period between a point in time at which the ascertainment is made by the branch prediction control unit that the branch prediction by the branch instruction prediction unit is erroneous and a point in time at which a correct instruction is fetched from the memory unit and the suppressing and the nullifying are starting in response to said ascertainment and are continuously output for said time period until the fetching of the correct instruction;
   wherein the signal informing of nullification of the instruction fetch request having already been supplied to the cache control unit causes the cache control unit of the memory unit to nullify the instruction fetch request having already been supplied to the cache control unit, and avoids replacement of the cache line in the cache memory caused by an instruction fetch operation corresponding to the instruction fetch request.

6. The method as claimed in claim 5, wherein the branch prediction control unit ascertains that the branch prediction by the branch instruction prediction unit is erroneous in a case in which a branch instruction for which branching is predicted turns out to be not branching, in a case in which a branch instruction for which no branching is predicted turns out to be branching, in a case in which an instruction that is not a branch instruction is predicted as branching, or in a case in which an address of a branch destination is incorrect with respect to a branch instruction for which branching is predicted.

7. A method of controlling an instruction control apparatus which fetches instructions from a memory unit, the memory unit including a cache control unit and a cache memory having cache lines holding a fetched instruction including and operand respectively, storing the instructions therein, and executes the instructions according to an out-of-order method, and which includes a branch instruction prediction unit configured to make branch prediction with respect to an instruction and a branch prediction control unit, said method comprising:
   outputting, to the cache control unit, a first cancellation signal indicating an invalid status one or more operand requests resulting from the instructions erroneously prepared for execution; and
   nullifying, by a second cancellation signal, one or more instructions prepared in an execution pipeline,
   wherein said steps are performed when the branch prediction control unit ascertains that the branch prediction by the branch instruction prediction unit is erroneous, during a time period between a point in time at which the ascertainment is made by the branch prediction control unit that the branch prediction by the branch instruction prediction unit is erroneous and a point in time at which a correct instruction is fetched from the memory unit and the first cancellation signal and the second cancellation signal are output in response to said ascertainment and are continuously output for said time period until the fetching of the correct instruction;
   wherein the first signal indicating an invalid status of one or more operand requests having already been supplied to the cache control unit causes the cache control unit of the memory unit to nullify the one or more operand requests having already been supplied to the cache control unit, and avoids replacement of a cache line in the cache memory caused by an operand fetch operation corresponding to the one or more operand requests.

8. The method as claimed in claim 7, wherein the branch prediction control unit ascertains that the branch prediction by the branch instruction prediction unit is erroneous in a case in which a branch instruction for which branching is predicted turns out to be not branching, in a case in which a branch instruction for which no branching is predicted turns out to be branching, in a case in which an instruction that is not a branch instruction is predicted as branching, or in a case in which an address of a branch destination is incorrect with respect to a branch instruction for which branching is predicted.

9. A method of controlling an instruction control apparatus which fetches instructions from a memory unit including a cache memory having cache lines holding a fetched instruction respectively, comprising:
   registering a branch instruction, supplied by an instruction buffer, in a branch instruction control unit;
   determining, by the branch instruction control unit, whether a branch prediction corresponding to the registered branch instruction has failed; and
   when the branch prediction corresponding to the registered branch instruction has failed:
     deleting the contents of the instruction buffer,
     removing branch instructions corresponding to instructions following the branch instruction for which the branch prediction has failed from the branch instruction control unit,
   suppressing execution of other instructions until the instruction for which the branch prediction has failed has completed,
   notifying a cache control unit of instructions following the branch instruction for which the branch prediction has failed, and nullifying operand requests having already been supplied to the cache control unit for the instructions following the branch instruction for which the branch prediction has failed to avoid replacement of a cache line in the cache memory caused by an operand fetch operation corresponding to the operand request.

* * * * *

UNITED STATES PATENT AND TRADEMARK OFFICE
CERTIFICATE OF CORRECTION

| | |
|---|---|
| PATENT NO. | : 7,636,837 B2 |
| APPLICATION NO. | : 11/114202 |
| DATED | : December 22, 2009 |
| INVENTOR(S) | : Ryuichi Sunayama et al. |

It is certified that error appears in the above-identified patent and that said Letters Patent is hereby corrected as shown below:

Title Page, item [56] Column 2 (Other Publications), Line 1, change "Operaging" to --Operating--.

Column 12, Line 15, change "unit" to --unit,--.

Signed and Sealed this

Sixteenth Day of March, 2010

David J. Kappos
*Director of the United States Patent and Trademark Office*